United States Patent
Maurel

(10) Patent No.: US 7,416,006 B2
(45) Date of Patent: Aug. 26, 2008

(54) REINFORCEMENT LAYER FOR A TIRE TREAD

(75) Inventor: Jean-Philippe Maurel, Ceyrat (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 125 days.

(21) Appl. No.: 11/377,661

(22) Filed: Mar. 16, 2006

(65) Prior Publication Data
US 2006/0196590 A1 Sep. 7, 2006

Related U.S. Application Data

(63) Continuation of application No. PCT/EP2004/010279, filed on Sep. 15, 2004.

(30) Foreign Application Priority Data

Sep. 18, 2003 (FR) .................................. 03 10989

(51) Int. Cl.
B60C 9/18 (2006.01)
B60C 9/22 (2006.01)

(52) U.S. Cl. .................. 152/526; 152/531; 152/534; 152/535; 152/538

(58) Field of Classification Search ............ 152/526, 152/531, 533, 534, 535, 537, 538
See application file for complete search history.

(56) References Cited

U.S. PATENT DOCUMENTS 4,690,191 A 9/1987 Kawasaki

FOREIGN PATENT DOCUMENTS

| DE | 3202039 | * | 7/1983 |
|---|---|---|---|
| GB | 2 017 019 | | 9/1979 |
| JP | 63106104 | * | 5/1988 |
| JP | 1-282004 | * | 11/1989 |
| JP | 5-69702 | | 3/1993 |
| JP | 6-171308 | | 6/1994 |

* cited by examiner

Primary Examiner—Justin Fischer
(74) Attorney, Agent, or Firm—Buchanan Ingersoll & Rooney PC

(57) ABSTRACT

A tire has a radial carcass reinforcement surmounted radially on the outside by a crown reinforcement which includes at least two working plies and two meridian reinforcement plies. The axially innermost ends of the meridian reinforcement plies are spaced axially apart. Each meridian reinforcement ply has a plurality of reinforcing elements making an angle larger than 60° with the tire's circumferential direction. The crown reinforcement also includes a circumferential reinforcement whose reinforcing elements make an angle no greater than 10° with the tire's equatorial plane. The tensile rigidity of the circumferential reinforcement in the circumferential direction in areas thereof that are radially coincident with the meridian reinforcement plies is lower than the tensile rigidity of the circumferential reinforcement in areas thereof that are not so radially coincident.

7 Claims, 2 Drawing Sheets

REINFORCEMENT LAYER FOR A TIRE TREAD

This application is a continuation of International Application Ser. No. PCT/EP04/010279 filed on Sep. 15, 2004, and published in the French language on Mar. 24, 2005 as WO 2005/025895.

FIELD OF INVENTION

The invention concerns tires with a radial carcass reinforced in an area known as the crown by a reinforcement composed of layers of reinforcing elements.

BACKGROUND OF INVENTION

A tire for a passenger car generally comprises a radial carcass reinforcement anchored in two beads and surmounted radially by a crown reinforcement, itself surmounted radially by a tread designed to be in contact with the road during rolling. The crown reinforcement comprises at least two layers, each formed of a plurality of reinforcing elements, the reinforcing elements of one layer being crossed relative to those of the adjacent layers.

These layers can for example be made in the form of plies, each ply consisting of a plurality of filaments or cords essentially parallel to one another. In another known form, the reinforcing elements are positioned individually or in groups of several at a time during the fabrication of the tire, without going through the prior stage of producing the plies. For convenience, in the text that follows, "ply" will be used to denote any layer of the crown reinforcement, regardless of how the said layer is obtained.

In the case of a tire whose carcass has textile reinforcing elements, to increase the mechanical triangulation effect in combination with the working plies it is known to provide the crown of the tire with a single additional ply whose reinforcing elements make an angle longer than 60° relative to the equatorial plane of the tire.

By definition, the equatorial plane of a tire is the plane perpendicular to the tire's rotation axis, which divides the crown reinforcement axially into two essentially identical parts.

In another known arrangement, instead of a single ply two additional plies can be used, positioned on either side of the equatorial plane whether symmetrically or not relative thereto.

Besides, and having regard to the high rotation speeds to which passenger car tires are subjected, it is known to provide the crowns of such tires with at least one additional reinforcement whose reinforcing elements are arranged essentially parallel to the equatorial plane (i.e. making an angle smaller than 10° with that plane). The reinforcing elements of this additional reinforcement can be textile or metallic and are chosen to have appropriate resistance to the forces to which the tires are subjected in service.

In the state of the prior art, Japanese document JP06/171308 shows a tire crown comprising two working plies, an additional meridian reinforcing ply (i.e. a ply whose reinforcing elements make an angle larger than 60° with the circumferential direction) positioned radially between the carcass and a first working ply, and radially outside the working plies, two additional layers of reinforcement elements orientated in the circumferential direction. On the other hand, document JP05/069702 shows a tire that can have a meridian reinforcement ply centered on the equatorial plane, or two meridian reinforcement plies arranged symmetrically relative to the said plane; that document also specifies the presence of two circumferential reinforcements arranged at the axially outer ends of the meridian reinforcement ply.

Another document, FR 2421074, describes a tire comprising two small meridian reinforcement plies arranged symmetrically relative to the equatorial plane and under the ends of the working plies; a single circumferential reinforcement is also provided, which is positioned axially between the said two small meridian reinforcement plies.

It was found that these solutions were not entirely satisfactory during the use of tires that have to meet the performance requirements of the vehicles produced nowadays and the requirements of users in relation to wear resistance (increased useful life) of the tires in service.

SUMMARY OF THE INVENTION

To address that aim, the tire according to the invention comprises a radial carcass reinforcement (i.e. one whose reinforcing elements make an angle of 90° or thereabouts with the circumferential direction), surmounted radially on the outside by a crown reinforcement of width Ls and comprising at least two so-termed "working" plies, each working ply consisting of a plurality of reinforcing elements arranged at an average angle between 17° and 35° relative to the circumferential direction, with the reinforcing elements of one working ply lying across those of another working ply, the said crown reinforcement also comprising two additional meridian reinforcement plies of axial width Lm and Lm', the axially innermost ends of the said meridian reinforcement plies being a distance Lt apart and the axially outermost ends of the said meridian reinforcement plies being a distance Le apart, these additional plies comprising a plurality of reinforcing elements that make an angle larger than 60° with the circumferential direction, the crown reinforcement also comprising at least one circumferential reinforcement (i.e. one whose reinforcing elements make, with the equatorial plane, an angle smaller than or equal to 10°) whose total width is L8, the said tire being characterized in that:

the total width L8 of the circumferential reinforcement is at least equal to the distance Le between the axially outermost ends of the two additional meridian reinforcement plies, the axially outermost ends (A, A') of the said meridian reinforcement plies are axially inside the axially outermost ends of the least wide working ply, the circumferential tensile rigidity of the circumferential reinforcement in areas radially coincident with the meridian reinforcement plies is lower than the tensile rigidity of the said reinforcement in areas having no meridian reinforcement plies.

An area radially coincident with a meridian reinforcement ply is an area radially outside or radially inside the radial projection of the said ply; that is to say, an area between two planes perpendicular to the axis of rotation and passing through the axial ends of the meridian reinforcement ply considered.

Preferably, the axial distance Lt between the meridian reinforcement plies is at most equal to 15% of the width Ls of the crown.

Preferably, the widths Lm, Lm' of the meridian reinforcement plies are between 37% and 49% of the width Ls of the crown. Advantageously, the meridian reinforcement plies are arranged on either side of the tire's equatorial plane.

The distance Le between the axially outermost ends of the two additional meridian reinforcement plies corresponds essentially to the sum of the distance Lt between the axially innermost ends of the said additional plies and the widths Lm and Lm' of the said plies.

The total width L8 corresponds to the axial distance between the ends axially furthest away from the circumferential reinforcement. Advantageously, the distance L8 is at least equal to the width Ls of the crown.

According to the invention, the circumferential reinforcement can be positioned radially outside the working plies, or between two working plies, or even radially under all the working plies.

Preferably, the tensile rigidity of the circumferential reinforcement in the circumferential direction in the areas radially coincident with the meridian reinforcement plies is at most equal to the tensile rigidity of the said reinforcement in the areas that have no meridian reinforcement plies.

The tensile rigidity of the circumferential reinforcement is defined as the ratio between a tensile force applied in the circumferential direction per unit width of the said reinforcement and the corresponding elongation (these values being either measured experimentally on specimens taken from a tire), or obtained by numerical simulation that takes into account the specific mechanical properties of the reinforcing elements and the dimensional characteristics of the reinforcement (number of reinforcements per unit width, i.e. in a direction perpendicular to the average direction of the reinforcing elements in the reinforcement).

The width Ls of the crown is taken as the largest width of mechanical coupling between at least two working plies; this coupling width is essentially equal to or smaller than the width of the widest working ply.

A variant embodiment consists in forming the circumferential reinforcement discontinuously in the axial direction: part of the said reinforcement is positioned above each area of the crown without a reinforcement ply (i.e. axially between the meridian reinforcement plies and axially outside them), the other areas (i.e. those provided with a meridian reinforcement ply) being totally without any such reinforcement.

Another variant embodiment consists in arranging a circumferential reinforcement continuously in the axial direction (i.e. such that the said reinforcement as a whole covers the full width Ls of the crown), while having rigidities that vary according to the areas.

Preferably, for each tire the mean compression rigidity of the meridian reinforcement ply in the direction of the reinforcing elements of the said ply, per unit length of the ply, is higher than 1 GPa ($1.10^9$ Pa, i.e. $1.10^9$ N/m²), this rigidity being obtained by multiplying the compression rigidity of one reinforcing element by the number of reinforcing elements per unit length of the ply.

The reinforcing elements of the circumferential reinforcement can be metallic or textile and can be used in the form of filaments or cords. According to the invention, the circumferential reinforcement can comprise reinforcing elements of different natures so as to obtain the desired circumferential tensile rigidity variations.

BRIEF DESCRIPTION OF THE DRAWINGS

Other characteristics and advantages of the invention emerge from the description given below with reference to the attached drawings, which illustrate embodiments of the invention presented as non-limiting examples.

Example embodiments, not presented with any limiting intention, are illustrated below by the attached drawings, in which.

DESCRIPTION OF THE PREFERRED EMBODIMENTS

Figure 1:
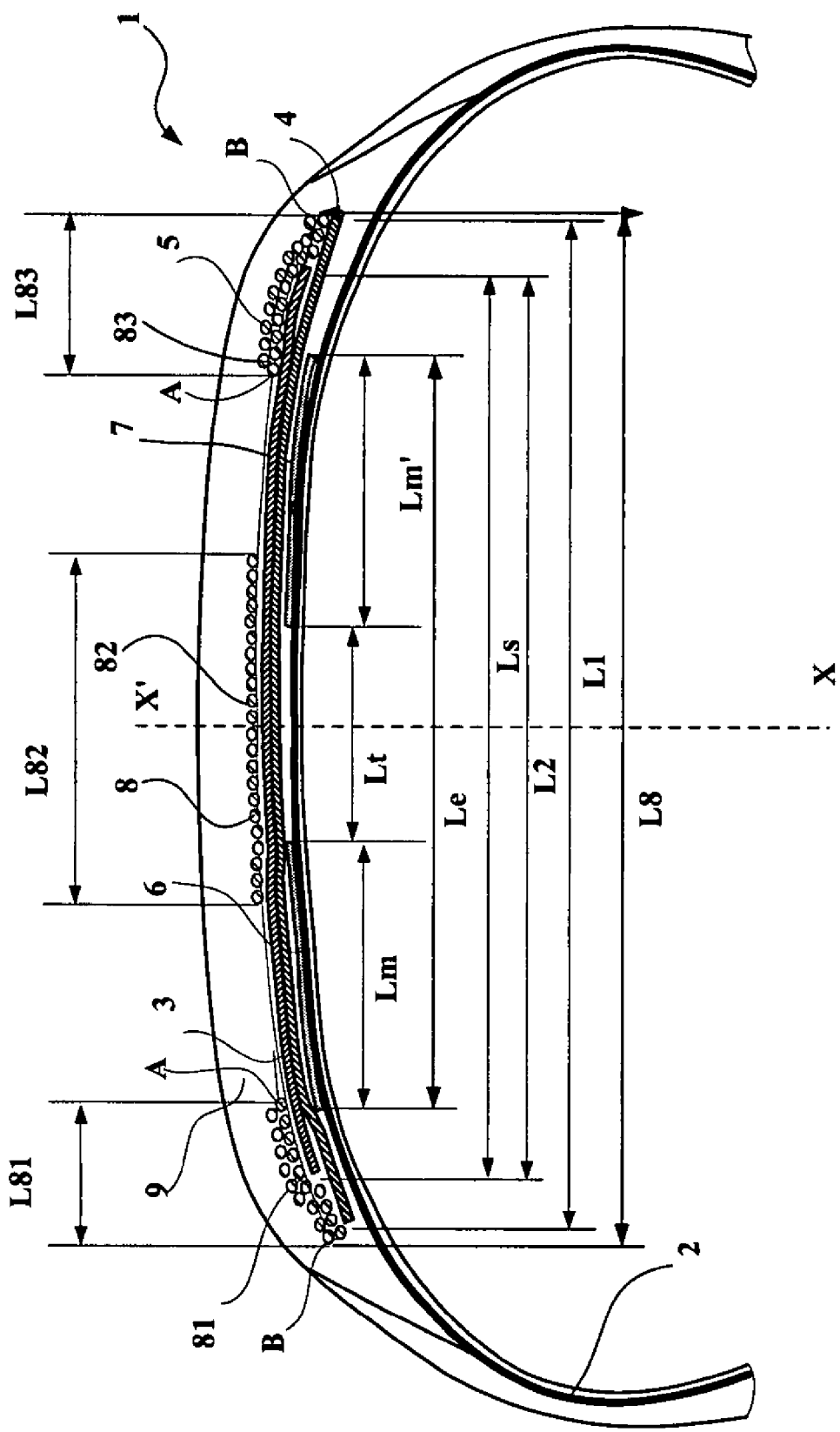
FIG. 1 shows a meridian section of a tire according to the invention comprising two meridian reinforcement plies and an axially discontinuous circumferential reinforcement.

FIG. 1 shows a variant embodiment of a tire of size 225/50 R 17 according to the invention. This tire comprises:

a radial carcass 2 whose reinforcing elements are polyester textile cords;

a crown 3 comprising first and second working plies 4, 5 whose reinforcing elements are metallic cords of structure 4-26 (i.e. four wires 0.26 mm in diameter) arranged in each ply with an average spacing of 1.25 mm (the spacing corresponds to the average distance between two reinforcing elements in the same ply). The angle of the reinforcing elements of the first working ply 4 radially nearest the carcass 2 is equal or close to 25° (relative to the circumferential direction) and that of the second working ply 5 is equal or close to −25° so that the reinforcing elements of the said second ply 5 are crossed with those of the first ply 4.

The widths L1 and L2 of the first and second working plies 4, 5 are respectively equal to: 194 and 180 mm. The width Ls of the crown is in this case equal to 180 mm and corresponds to the width of the less wide working ply 5.

Furthermore, on either side of the equatorial plane (whose trace is the line XX' in the figure plane) there are positioned two additional meridian crown reinforcement plies 6, 7 whose widths Lm and Lm' are each equal to 76 mm. These plies are composed of metallic reinforcing elements of structure identical to that of the cords in the working plies 4, 5; the reinforcing elements of the said additional plies 6, 7 are arranged in each of them with an average spacing of 2.00 mm and at an average angle of 90° relative to the circumferential direction. The axially outermost ends of each additional meridian reinforcement ply 6, 7 are axially inside the position of the axially outer ends of the less wide working ply (here, the radially outermost ply 5).

The distance Lt separating the axially innermost ends (i.e. those closest to the equatorial plane) of the meridian reinforcement plies is in this case equal to 12 mm. This distance is equal to 6% of the width Ls of the crown.

Moreover, radially on the outside, the crown reinforcement has an axially discontinuous circumferential reinforcement 8 formed in three distinct parts 81, 82, 83 of widths L81, L82, L83 respectively; each part of the circumferential reinforcement 8 comprises a plurality of reinforcing elements arranged at an angle equal or close to 0° relative to the circumferential direction. In the present case, these reinforcing elements are Nylon® 140×2 cords arranged with a spacing of 1 mm. The widths L81, L82, L83 are equal to 35, 30 and 35 mm respectively. The distance L8 separating the axially outermost ends of the circumferential reinforcement 8 is close to the width L1 of the first working ply, and is thus larger than the distance Le separating the axially most widely separated ends of the meridian reinforcement plies 6, 7.

The part 82 of the circumferential reinforcement in the meridian position has a width L82 equal to 30 mm. This central reinforcement is such that it totally covers the distance Lt between the ends of the meridian reinforcement plies 6, 7 closest to the equatorial plane, but without covering the said meridian reinforcement plies over more than 20% of their respective widths.

The other two parts 81, 83 of the circumferential reinforcement located near the axially outer ends of the crown reinforcement are symmetrical relative to the equatorial plane of the tire and are composed of reinforcing elements with the same characteristics are those used for the central part 82, being arranged to form two layers in the radial direction (the circumferential rigidity here is twice the rigidity of the central part). Each of these so-termed "edge" circumferential reinforcements extends between a first, axially inner point A close to the axially outermost end of the meridian reinforcement plies so as to cover it, and a second, axially outer point B located axially at the level of the end of the widest working ply 4. In the present case, the first point A is located 77 mm away from the equatorial plane (i.e. axially inside the axially outermost point of the meridian reinforcement plies 6, 7) and the second point B is 103 mm away from the equatorial plane.

The assembly comprising carcass, crown and additional plies and reinforcements is, moreover, surmounted radially on the outside by a tire tread 9.

In service on a vehicle, a decrease in wear of the order of 25% has been measured compared with a tire having the same meridian reinforcement plies but without a circumferential reinforcement adapted according to the invention.

Figure 2:
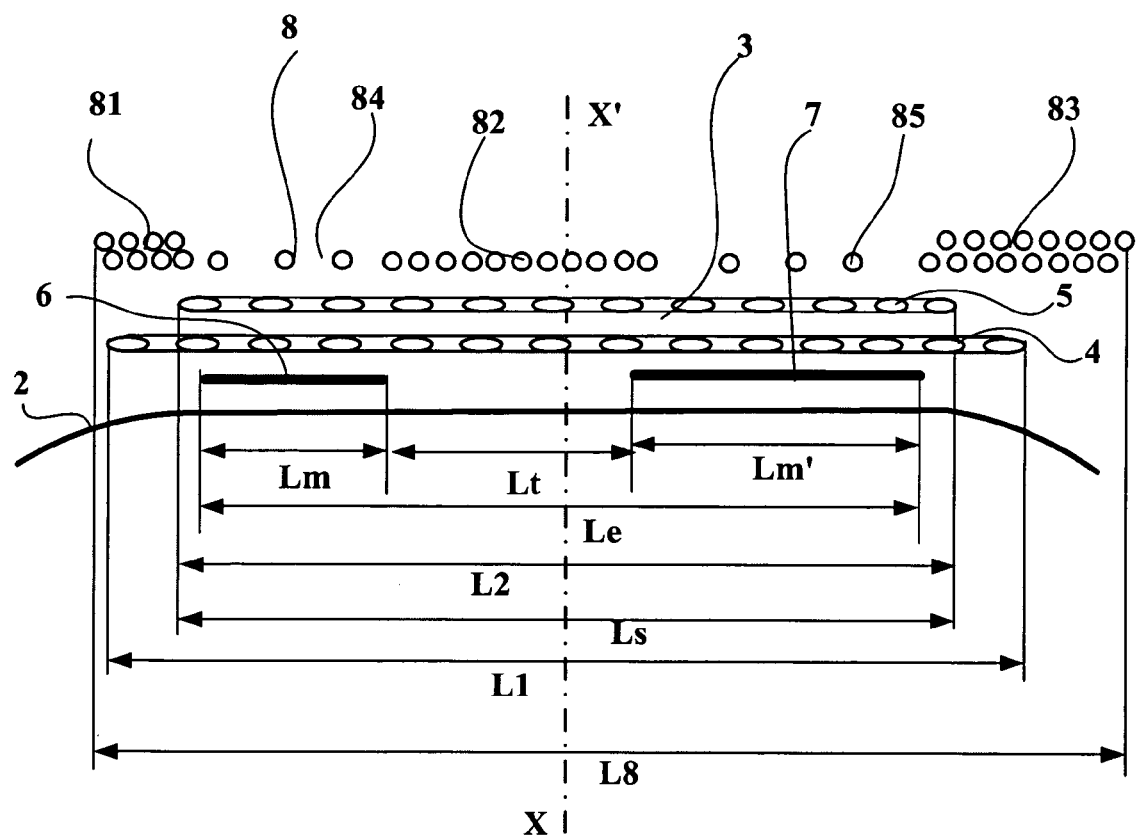
FIG. 2 shows a second variant in which the circumferential reinforcement is axially continuous.

The variant crown reinforcement according to a variant of the invention illustrated in FIG. 2 differs from that described with reference to FIG. 1 in that the additional circumferential reinforcement 8 is axially continuous and, in the axial direction (i.e. the direction perpendicular to the trace XX' of the equatorial plane of the tire in FIG. 2), has variations of the circumferential rigidity corresponding to the areas in which meridian reinforcement plies are, or are not present. More precisely, the crown reinforcement 3 comprises two meridian reinforcement plies 6, 7 between the carcass reinforcement 2 and the working plies 4, 5 and, radially on the outside, a circumferential reinforcement 8 in the form of a ply formed by reinforcing elements wrapped in the circumferential direction. This wrapping is carried out with the same reinforcing element in such manner as to obtain an axial distance between its turns which is smaller above the areas without a meridian reinforcement ply than the axial distance between them in the regions above the meridian reinforcement plies. Besides, the additional meridian reinforcement plies are arranged asymmetrically relative to the equatorial plane, with the ply 6 furthest away from the equatorial plane being able to be on the side of the tire on the outside of the vehicle when the said tire is in use.

The circumferential reinforcement ply 8 has five areas 81, 84, 82, 85, 83 which are axially consecutive from one edge of the crown to the other (the areas 81, 82 and 83 corresponding to the edge and medium areas as in the image of the variant shown in FIG. 1). The areas 84, 85 radially above the meridian reinforcement plies 6, 7 have circumferential reinforcing elements arranged with a spacing between them which is larger than the spacing between the reinforcing elements of the edge areas 81, 83 and the meridian area 82, and consequently the said areas 84, 85 have a lower circumferential tensile rigidity. The distance L8 between the axially outermost ends of the circumferential reinforcement 8 is very slightly larger in this case than the width L1 of the first working ply, and is thus larger than the distance Le between the axially furthest apart ends of the meridian reinforcement plies 6, 7.

In this last variant, the variation of the rigidity of the circumferential reinforcement can be obtained by using reinforcing elements of different natures depending on their areas while ensuring axial continuity of the reinforcement (i.e. with circumferential reinforcement present across the full width of the crown reinforcement).

In another variant (not shown) the meridian reinforcement plies are arranged radially between the two working plies.

In another variant of the invention (not shown) the circumferential reinforcement is positioned between the working plies.

Of course, what has been described with reference to the figures is not to be regarded as limiting, and in particular the number of working plies can be more than two.

What is claimed is:

1. A tire comprising a radial carcass reinforcement surmounted radially on the outside by a crown reinforcement of width (Ls) comprising at least two working plies, each working ply being composed of a plurality of reinforcing elements arranged at an average angle between 17° and 35° relative to the circumferential direction with the reinforcing elements of one working ply crossed relative to those of another working ply, this crown reinforcement also comprising two additional meridian reinforcement plies of axial width (Lm) and (Lm'), the axially innermost ends of the said meridian reinforcement plies being a distance (Lt) apart, the axially outermost ends of the said meridian reinforcement plies being a distance (Le) apart, these additional plies comprising a plurality of reinforcing elements that make an angle larger than 60° with the circumferential direction, the crown reinforcement also comprising at least one circumferential reinforcement of total width (L8) whose reinforcing elements make an angle smaller than or equal to 10° with the equatorial plane, wherein:

the total width (L8) of the circumferential reinforcement is at least equal to the distance (Le) between the axially outermost ends of the two additional meridian reinforcement plies, the axially outermost ends of the meridian reinforcement plies are axially inside the axially outermost ends of the least wide working ply, the tensile rigidity of the circumferential reinforcement in the circumferential direction is lower in the areas thereof radially coincident with the meridian reinforcement plies, than is the tensile rigidity of the circumferential reinforcement in the areas thereof that are not radially coincident with the meridian reinforcement plies.

2. The tire according to claim 1 wherein the axial distance (Lt) between the meridian reinforcement plies is at most equal to 15% of the width (Ls) of the crown.

3. The tire according to claim 1, wherein the widths (Lm, Lm') of the meridian reinforcement plies are between 37% and 49% of the width (Ls) of the crown.

4. The tire according to claim 1, wherein the meridian reinforcement plies are positioned on either side of the equatorial plane of the tire.

5. The tire according to claim 1, wherein the circumferential reinforcement is positioned radially outside the working plies.

6. The tire according to claim 1, wherein the tensile rigidity of the circumferential reinforcement in the circumferential direction in areas radially coincident with the meridian reinforcement plies is at most equal to 50% of the tensile rigidity of the said reinforcement in areas having no meridian reinforcement plies.

7. The tire according to claim 1, wherein the circumferential reinforcement is discontinuous in the axial direction.

* * * * *